(12) United States Patent
Shiomi et al.

(10) Patent No.: US 8,484,969 B2
(45) Date of Patent: Jul. 16, 2013

(54) ENGINE

(75) Inventors: Hideo Shiomi, Osaka (JP); Yasuhiro Ozaki, Osaka (JP); Takeshi Fujii, Osaka (JP)

(73) Assignee: Yanmar Co., Ltd., Osaka (JP)

( * ) Notice: Subject to any disclaimer, the term of this patent is extended or adjusted under 35 U.S.C. 154(b) by 753 days.

(21) Appl. No.: 12/672,167

(22) PCT Filed: Aug. 5, 2008

(86) PCT No.: PCT/JP2008/064003
§ 371 (c)(1),
(2), (4) Date: Feb. 4, 2010

(87) PCT Pub. No.: WO2009/020113
PCT Pub. Date: Feb. 12, 2009

(65) Prior Publication Data
US 2011/0203556 A1    Aug. 25, 2011

(30) Foreign Application Priority Data

Aug. 9, 2007  (JP) ................ 2007-208556
Apr. 22, 2008  (JP) ................ 2008-111066

(51) Int. Cl.
*F02B 33/44*   (2006.01)

(52) U.S. Cl.
USPC ........... 60/605.2; 60/278; 701/108; 123/352; 123/568.21

(58) Field of Classification Search
USPC .. 60/278, 605.2; 701/108, 104, 110; 123/352, 123/357, 358
See application file for complete search history.

(56) References Cited

U.S. PATENT DOCUMENTS 5,675,080 A * 10/1997 Wada ................ 73/114.74
5,826,559 A * 10/1998 Ichimoto et al. ........ 123/295
(Continued)

FOREIGN PATENT DOCUMENTS

JP   63106354 A * 5/1988
JP   08312466 A * 11/1996
(Continued)

OTHER PUBLICATIONS

JP-63-106354 Machine Translation on Nov. 13, 2012.*

(Continued)

*Primary Examiner* — Thomas Denion
*Assistant Examiner* — Patrick Maines
(74) *Attorney, Agent, or Firm* — Sterne, Kessler, Goldstein & Fox P.L.L.C.

(57) ABSTRACT

In an engine such as an engine for driving a pump or dynamo, in which a load increasing state does not appear as an accelerating state of rotation speed, it is intended to prevent the smoke emission in an abruptly load-increasing state, which might otherwise be caused by the suppression or interruption of an EGR quantity. The engine 10 comprises a supercharger 11 and an exhaust gas recirculation (EGR) device 12. The engine 10 makes an isochronous control or a droop control, when its rotation speed N is shifted from a no-load (idle) or light-load run to a high-load (load-increasing) state. In case it is detected, when the state of the engine 10 shifts to a load state, that the actual rotation speed N becomes lower by a predetermined rotation speed ΔN than a target rotation speed Nm, an EGR valve 13 of the exhaust gas recirculation (EGR) device 12 is either throttled to an opening smaller by a predetermined opening ΔF than the ordinary set opening F corresponding to the load state or fully closed.

7 Claims, 6 Drawing Sheets

U.S. PATENT DOCUMENTS

| | | | |
|---|---|---|---|
| 7,066,144 B2 * | 6/2006 | Harunari et al. | 123/399 |
| 2003/0196635 A1 * | 10/2003 | Kataoka et al. | 123/299 |
| 2004/0182372 A1 * | 9/2004 | Kennedy | 123/568.11 |
| 2005/0263118 A1 * | 12/2005 | Nakai et al. | 123/90.15 |
| 2008/0295514 A1 * | 12/2008 | Ono | 60/602 |

FOREIGN PATENT DOCUMENTS

| | | |
|---|---|---|
| JP | 9-21356 | 1/1997 |
| JP | 9-79092 | 3/1997 |
| JP | 2000-274263 | 10/2000 |
| JP | 2001-028900 | 1/2001 |
| JP | 2002-161791 | 6/2002 |
| JP | 2002161791 A * | 6/2002 |
| JP | 2003-278581 | 10/2003 |
| JP | 2004-190541 | 7/2004 |
| JP | 2007-092757 | 4/2007 |
| JP | 2007092757 A * | 4/2007 |

OTHER PUBLICATIONS

JP-08-312466 Machine Translation on Nov. 13, 2012.*
JP-2002-161791 Machine Translation on Nov. 13, 2012.*
JP-2007-092757 Machine Translation on Nov. 13, 2012.*
International Search Report for International Application No. PCT/JP2008/064003, Japanese Patent Office mailed Oct. 21, 2008, 2 pgs.

* cited by examiner

ENGINE

TECHNICAL FIELD

The present invention relates to an engine having a supercharger and an exhaust gas recirculation (EGR) device.

BACKGROUND ART

Conventionally, there is well known an engine having a supercharger and an EGR device. The supercharger compresses air and sends the air to the engine compulsorily. Compared with a normal engine with the same displacement, the engine having the supercharger can generate larger output and torque.

The EGR device returns a part of exhaust gas to the intake side. The EGR device has an EGR valve in an EGR passage connecting the exhaust side to the intake side.

The EGR valve is opened and closed so as to regulate amount of the exhaust gas returned to the intake side. Accordingly, the EGR device reduces the combustion temperature of the engine so as to suppress generation of nitrogen oxides (NOx) which cause photochemical smog.

However, at the transient state of the engine, delay of response of the supercharger or throttle of intake and exhaust caused by the supercharger itself increases the EGR amount excessively, whereby intake air amount is in short extremely against injection amount so as to generate smoke. For preventing the generation of smoke, several EGR amount control means are disclosed.

The Japanese Patent Laid Open Gazette Hei. 09-021356 discloses an engine with a supercharger which revises EGR gas amount so as to prevent increase of smoke by excessive response at sudden acceleration. The Japanese Patent Laid Open Gazette Hei. 09-079092 discloses an engine that the EGR rate is reduced to about 10% at the time of shift from idling to acceleration state. The Japanese Patent Laid Open Gazette 2002-161791 discloses an engine that the EGR valve is fully closed at the time of sudden acceleration.

Each of the above patent literature and the conventional art is suppression or interruption of the EGR at the acceleration state (that is, at the time of increasing engine rotation speed) and does not intend for suppression or interruption of the EGR at the time of reducing engine rotation speed.

DISCLOSURE OF INVENTION

Problems to be Solved by the Invention

In an engine such as an engine for driving a pump or dynamo, in which a load increasing state does not appear as an accelerating state of rotation speed, the present invention is intended to prevent the smoke emission in an abruptly load-increasing state, which might otherwise be caused by the suppression or interruption of an EGR quantity.

Means for Solving the Problems

According to the present invention, with regard to an engine having a supercharger and an EGR device which executes isochronus control so as to keep target rotation speed the same as that at idling or executes droop control so as to reduce the target rotation speed for predetermined percentage corresponding to load state when rotation speed of the engine is shifted from a no-load or light-load run to a high-load state, when actual rotation speed of the engine is detected to be lower than the target rotation speed for predetermined rotation speed, an EGR valve of the EGR device is either closed to opening smaller than normal set, opening corresponding to the load state for predetermined opening or fully closed.

With regard to the engine of the present invention, a condition for making opening of the EGR valve return to the normal set opening corresponding to the load state is that deficiency amount of the actual rotation speed against the target rotation speed is not larger than predetermined amount.

With regard to the engine of the present invention, preferably, passage of predetermined time at load shift state is also adopted as the condition for making opening of the EGR valve return to the normal set opening corresponding to the load state so that the opening of the EGR valve is returned to the normal set opening corresponding to the load state after the passage of predetermined time even if the return condition is not satisfied that the deficiency amount of the actual rotation speed against the target rotation speed is not larger than the predetermined amount.

With regard to the engine of the present invention, preferably, actual rotation speed is detected, and when difference between the actual rotation speed predetermined period before and the latest actual rotation speed is larger than a first threshold for predetermined times continuously, the EGR valve of the EGR device is either closed to the opening to be smaller than the normal set opening corresponding to the load state for the predetermined opening or fully closed.

With regard to the engine of the present invention, preferably, when the latest actual rotation speed is larger than predetermined rotation speed, the throttle control of the EGR valve is not executed.

With regard to the engine of the present invention, preferably, at the judgment of the threshold, when engine load rate at the first judgment is larger than predetermined load rate, the throttle control of the EGR valve is not executed.

With regard to the engine of the present invention, preferably, when difference between target rotation speed and the latest actual rotation speed is smaller than a second threshold, the opening of the EGR valve is returned to the normal set opening corresponding to the load state.

With regard to the engine of the present invention, preferably, a release timer is actuated at a point of time of start of the throttle control of the EGR valve, and when the difference between the target rotation speed and the latest actual rotation speed is not smaller than the second threshold and measurement time of the release timer reaches predetermined time, the opening of the EGR valve is returned to the normal set opening corresponding to the load state.

With regard to the engine of the present invention, preferably, when the execution condition of the throttle control of the EGR valve is satisfied again, the release timer is reset and actuated again.

Effect of the Invention

According to the engine of the present invention, with regard to the engine having the supercharger and the EGR device that load increase state is not found as acceleration state of rotation speed such as an engine for driving a pump or a dynamo, the EGR excess which is caused by delay of response of the supercharger and which causes shortage of intake air amount is canceled, thereby preventing generation of smoke.

According to the engine of the present invention, the EGR is restarted under the state that the supercharger is actuated so as to make the intake air amount normal.

According to the engine of the present invention, in the case that the supercharger is actuated so as to make the intake air amount normal while the difference between the target rotation speed and the actual rotation speed is not smaller than the predetermined amount according to the load state, the EGR can be restarted without any delay.

According to the engine of the present invention, when the predetermined reduction of the actual rotation speed causes continuously, the load is judged to be increased suddenly and the EGR valve is closed for predetermined opening or fully closed, whereby the fuel injection amount is prevented from reacting excessively to the change of the rotation speed caused by the increase or reduction of load near the maximum permissible value. Namely, the suppression of the EGR amount is only executed at the time of pertinent sudden increase of the load.

According to the engine of the present invention, when the supercharger is judged to be actuated normally, the EGR valve throttle control is not executed, whereby unnecessary suppression of EGR amount can be prevented.

According to the engine of the present invention, in the situation that the supercharger is judged to be actuated normally, the EGR amount can be recovered immediately.

According to the engine of the present invention, when the supercharger is actuated normally though the rotation speed does not return to the target region enough because of the load state, unnecessary suppression of EGR amount can be prevented.

According to the engine of the present invention, the EGR valve throttle control can be continued suitably even if the sudden increase of the load is performed gradually.

THE BEST MODE FOR CARRYING OUT THE INVENTION

Firstly, explanation will be given briefly on an engine having a supercharger and an EGR device referring FIG. 1. In this embodiment, the engine 10 is mounted in a construction equipment and drives a hydraulic pump.

Figure 1:
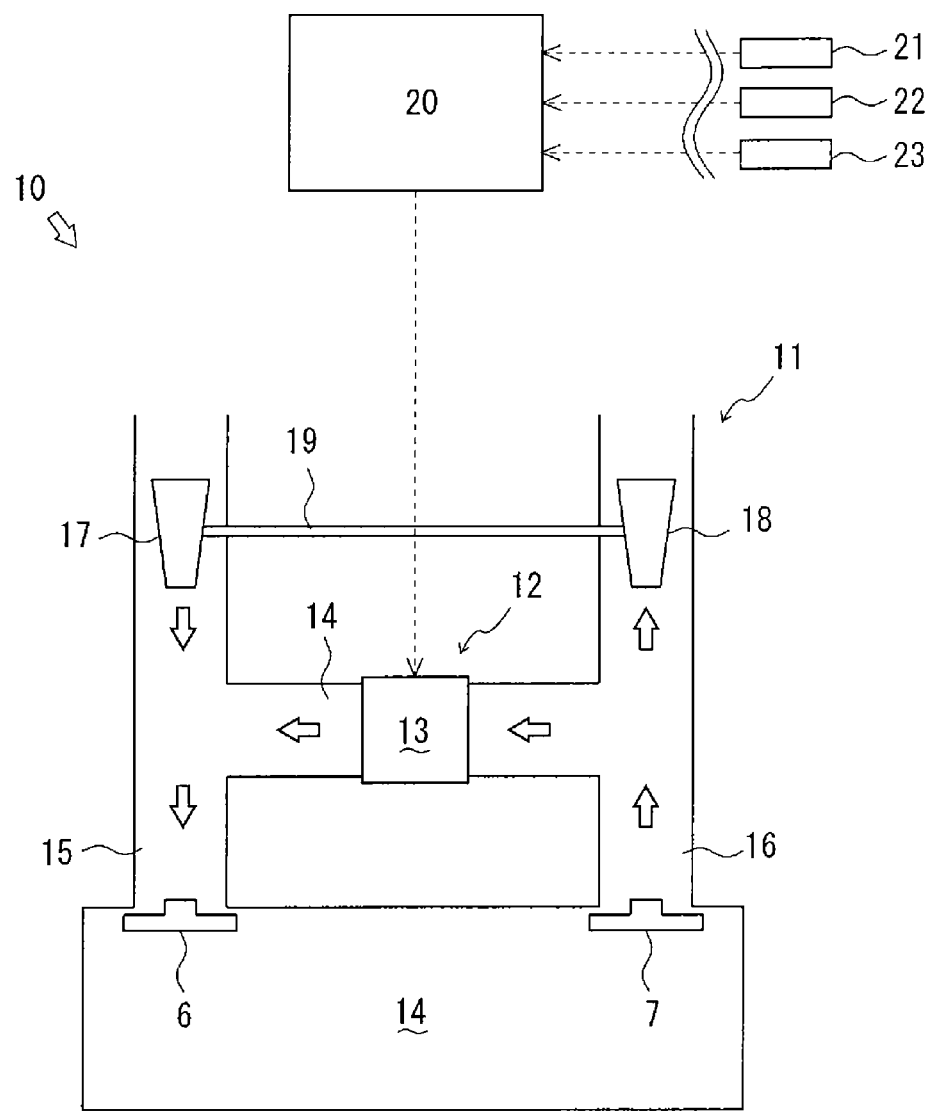
FIG. 1 is a schematic drawing of entire construction of an engine having a supercharger and an EGR device according to the present invention.

As shown in FIG. 1, the engine 10 has a supercharger 11 and an exhaust gas recirculation device (hereinafter, referred to as EGR device) 12. An intake pipe 15 and an exhaust pipe 16 are connected to a cylinder head constituting a combustion chamber 9, and closable respectively by an intake valve 6 and an exhaust valve 7. An EGR passage 14 bypassively connects the intake pipe 15 to the exhaust pipe 16. A compressor 17 is provided in the intake pipe 15 at the upstream side from the EGR passage 14, and an exhaust turbine 18 is provided in the exhaust pipe 16 at the downstream side from the EGR passage 14. The combustion chamber 9 is a closed space surrounded by the cylinder head, a piston head and a cylinder block.

The supercharger 11 compresses air and sends the air to the engine 10 compulsorily. In this embodiment, the supercharger 11 is a well-known turbocharger. The supercharger 11 comprises the compressor 17 and the exhaust turbine 18. The compressor 17 is connected to the exhaust turbine 18 by a rotation shaft 19. According to the construction, the exhaust turbine 18 is actuated (rotated) by ejection of exhaust gas, and the compressor 17 is driven simultaneously through the rotation shaft 19 so as to send compressed air to the combustion chamber 9.

The EGR device 12 returns a part of exhaust gas to the intake side. The EGR device 12 compresses the EGR passage 14 and an EGR valve 13 which is an on-off valve provided in the EGR passage 14. The EGR valve 13 regulates amount of the exhaust gas returned to the intake side based on change of on-off time or change of on-off amount. Accordingly, the EGR device reduces combustion temperature so as to suppress generation of nitrogen oxides (NOx) which cause photochemical smog.

An Electronic Control Unit (hereinafter, simply referred to as "ECU") 20 receives signals from sensors detecting engine driving status (a rotation speed sensor 21, an accelerator position sensor 22, a rack position sensor 23 and the like) and executes on-off control of the EGR valve 13, control of a rack actuator and the like.

The rotation speed sensor 21 detects actual rotation speed N of the engine 10. The accelerator position sensor 22 detects accelerator position as target rotation speed Nm of the engine 10. The rack position sensor 23 detects rack position L of a fuel injector (not shown) as engine load, that is, fuel injection amount. According to the construction, an EGR rate is controlled by the EGR valve 13 corresponding to the engine status appropriately.

The ECU 20 actuates the rack actuator so as to control electronically fuel injection amount of the engine 10, thereby stabilizing the engine rotation speed N at the target rotation speed Nm. Conventionally, as a control means of fuel injection amount, there is well known isochronus control and droop control. According to the isochronus control, when load is applied on the engine 10 and the rotation speed N is reduced, fuel injection amount is increased so as to make the reduced rotation speed return, thereby maintaining the initial rotation speed Nm. On the other hand, according to the droop control, when load is applied on the engine 10, fuel injection amount is increased while the rotation speed N is reduced corresponding to the magnitude of the load. In this embodiment, as such a control, the predetermined target rotation speed Nm is maintained against the change of the engine load.

Explanation will be given in detail on EGR suppression control referring to FIGS. 2, 3 and 6.

Figure 2:
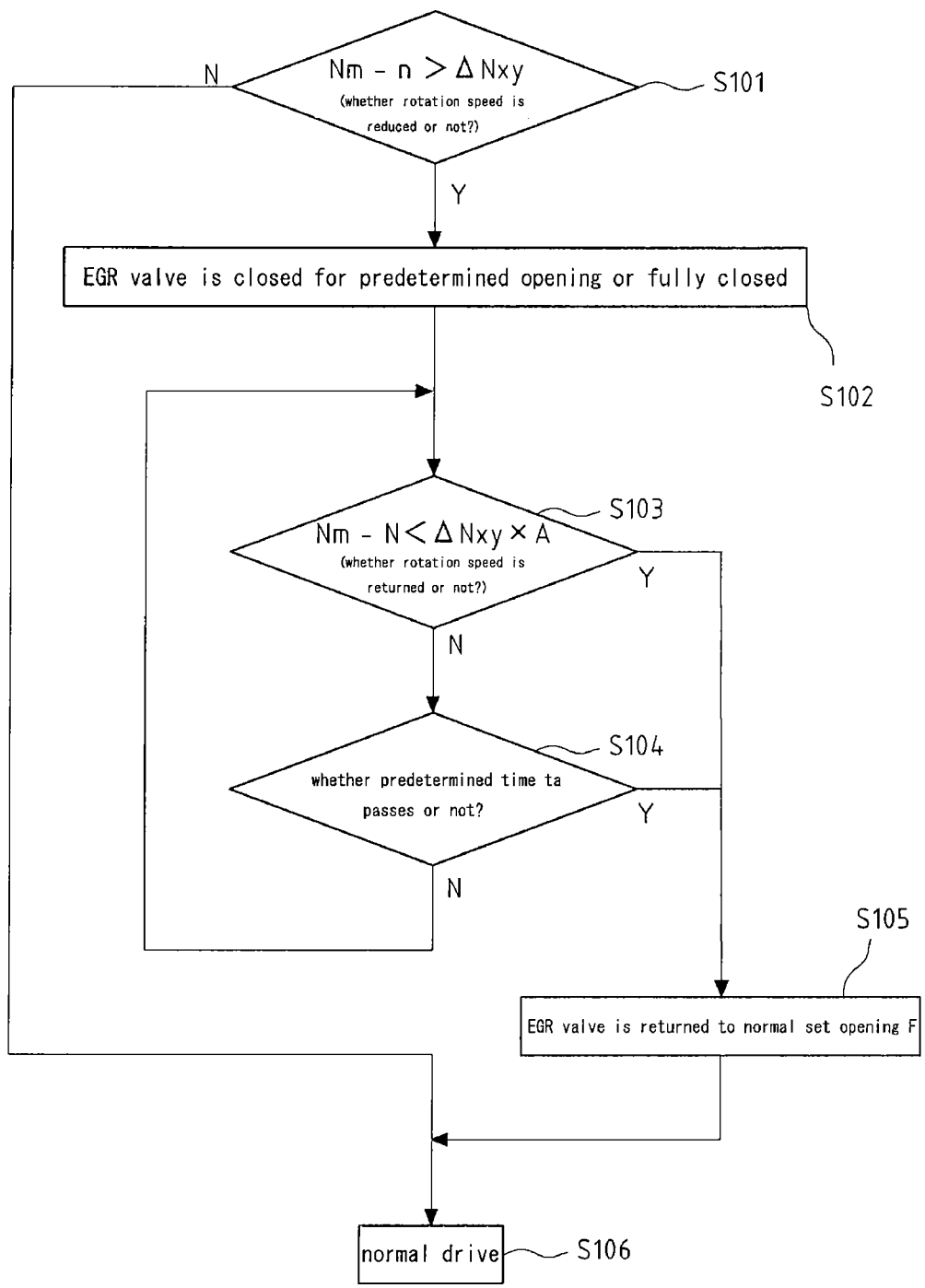
FIG. 2 is a flow chart of EGR suppression control.

As shown in FIG. 2, according to the EGR suppression control, when reduction of rotation speed caused by applying load on the engine 10 is detected (S101), the EGR valve 13 is closed for predetermined opening from normal set opening (S102) so as to suppress the EGR rate.

When the ECU 20 detects that the difference between the target rotation speed Nm and the actual rotation speed N is larger than predetermined threshold $\Delta Nxy$, the ECU 20 judges the EGR suppression to be required (S101). When the detection does not exist, the engine 10 is driven normally (S106).

When the above-mentioned detection exists, as the EGR suppression control, the ECU 20 closes the EGR valve 13 for predetermined opening $\Delta F$ from the normal set opening Fxy (S102). Alternatively, the EGR valve 13 may be closed fully as EGR interruption control.

When load is applied on the engine 10, the engine rotation speed is kept at the target rotation speed by the isochronus control, or the engine rotation speed is reduced for the predetermined percentage corresponding to the load state by the droop control, whereby the load increase state does not appear as acceleration state of the rotation speed. In this embodiment, when the reduction of rotation speed not smaller than the above-mentioned predetermined amount (ΔNxy) is detected, the EGR suppression control or the interruption control is executed. Accordingly, the EGR excess which is caused by delay of response of the supercharger 11 and which causes shortage of intake air amount is canceled, thereby preventing generation of smoke.

After the EGR suppression control or the interruption control (S102), as a first return condition, the ECU 20 checks whether or not the difference between the target rotation speed Nm and the actual rotation speed N is smaller than predetermined percentage A (0 to 100%) of the predetermined threshold ΔNxy (S103). When the first return condition is satisfied, the rotation speed of the engine 10 is judged to be returned.

When the return is judged according to the first return condition, the ECU 20 makes the EGR valve 13 return to the normal set opening Fxy (S105) and performs normal drive (S106). Accordingly, the EGR is restarted under the state that the supercharger 11 is actuated so as to make the intake air amount normal.

When the first return condition (S103) is not satisfied, the ECU 20 checks whether or not predetermined time to passes from the detection of reduction of rotation speed not smaller than the predetermined value (ΔNxy) (S102) as a second return condition (S104). When the second return condition is satisfied, the EGR is judged to be able to be restarted.

When the EGR is judged to be able to be restarted according to the second return condition, the ECU 20 makes the EGR valve 13 return to the normal set opening Fxy (S105) and performs normal drive (S106) as mentioned above.

Accordingly, in the case that the supercharger is actuated so as to make the intake air amount normal while the difference between the target rotation speed and the actual rotation speed is not smaller than the predetermined amount according to the load state, the EGR can be restarted without any delay.

Figure 3:
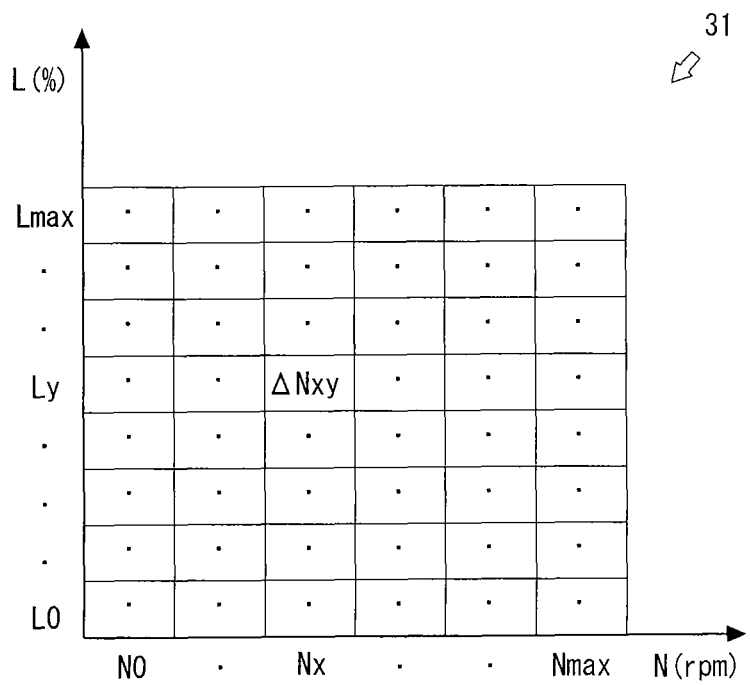
FIG. 3 is a table diagram of a revolution number threshold map.

As shown in FIG. 3, the predetermined threshold ΔNxy is previously stored in a storage means such as a ROM of the ECU 20 as a predetermined threshold map 31 which indicates the threshold for each the actual rotation speed N and the actual rack position L.

The actual rotation speed N is indicated as N(x) from N(min) to N(max). On the other hand, the actual rack position L(y) is indicated from L(min) to L(max). Accordingly, the number of the set predetermined thresholds ΔNxy is the product of cell number of the actual rotation speed N and cell number of the actual rack position L.

Accordingly, at the detection of reduction of rotation speed (S102), the predetermined thresholds ΔNxy can be set corresponding to the actual rotation speed N of the engine 10 and the applied load amount.

Explanation will be given in detail on judgment whether throttle control of the EGR valve is required or not and the throttle control of the EGR valve referring FIGS. 4 and 5.

Figure 4:
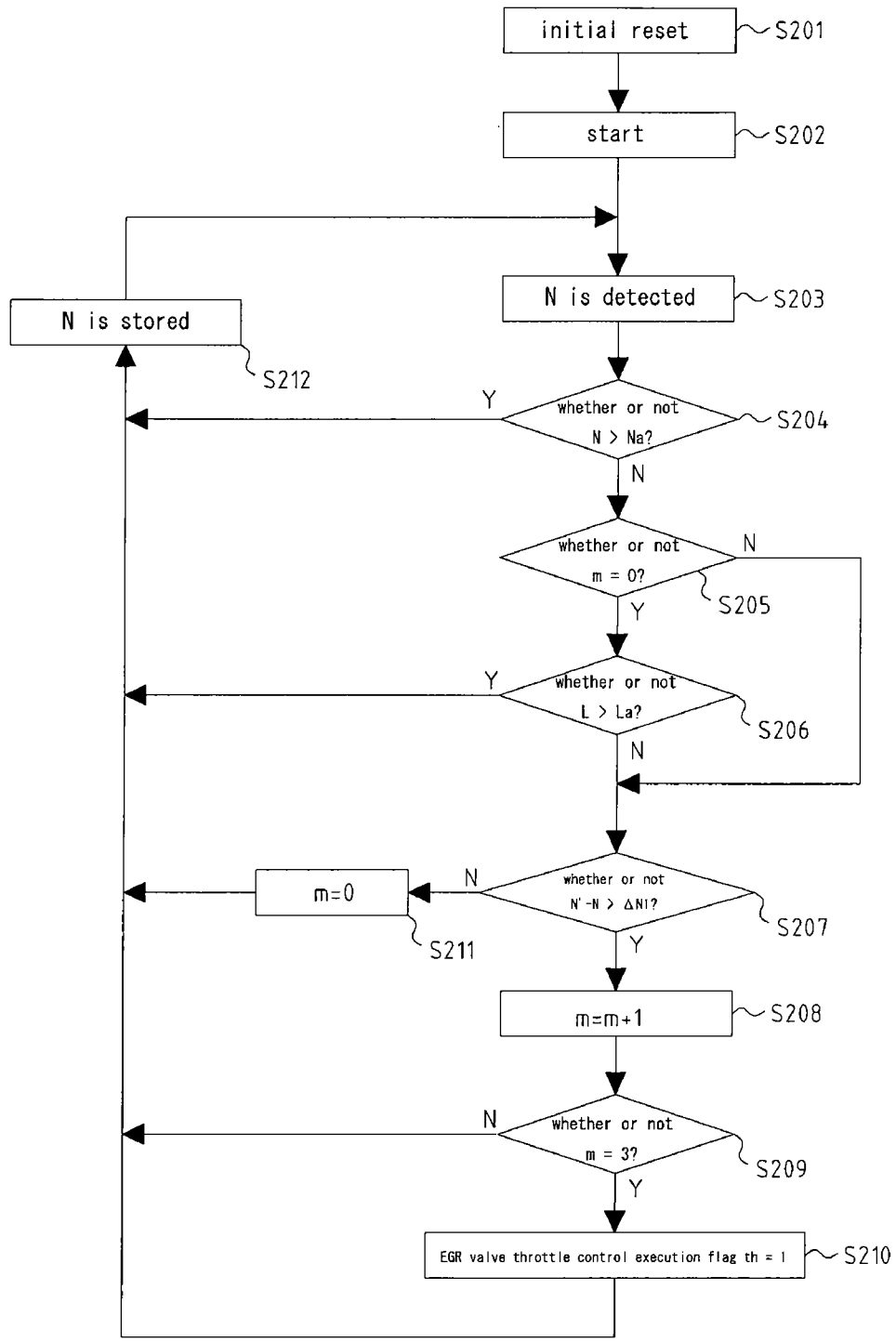
FIG. 4 is a flow chart of judgment whether throttle control of an EGR valve is required or not.

As shown in FIG. 4, at the judgment whether throttle control of the EGR valve, it is judged whether the control flow shifts to the later-discussed throttle control of the EGR valve or not.

Firstly, the ECU 20 resets all later-discussed read values (S201), and then starts this judgment (S202). Next, the ECU 20 detects the latest actual rotation speed N (S203) and judges whether or not the actual rotation speed is larger than predetermined rotation speed Na (S204). At this time, when the actual rotation speed N is larger than the predetermined rotation speed Na, the control flow shifts to S212. Here, the ECU 20 stores the sampled latest actual rotation speed N (S212). In this embodiment, the ECU 20 stores the actual rotation speed N sampled for each of three periods from the period of the latest sampled actual rotation speed N.

When the actual rotation speed N is not larger than the predetermined rotation speed Na, the ECU 20 judges whether a judgment flag m is 0 or not (S205). The judgment flag m indicates number of judgment of S207 discussed later. When the judgment flag m is not 0, the control flow shifts to S207.

When the judgment flag m is 0, the ECU 20 judges whether the engine load is not smaller than predetermined load factor, that is, whether the rack position L is larger than predetermined position La or not (S206). When the rack position L is larger than the predetermined position La, the control flow shifts to S212.

In an engine performance curve indicated by the target rotation speed Nm and the rack position L, in a region larger than the predetermined rotation speed Na or a region larger than the predetermined position La, the supercharger 11 is judged to be actuated normally. Namely, in the situation that the supercharger 11 is judged to be actuated normally, the control flow does not shift to later-discussed EGR valve throttle control, whereby unnecessary suppression of EGR amount can be prevented.

When the actual rotation speed N is not larger than the predetermined rotation speed Na and the rack position L is not larger than the predetermined position La, the ECU 20 judges whether or not the difference between actual rotation speed N' sampled one period before as the predetermined period before and the latest actual rotation speed N is larger than a first threshold ΔN1 (S207). Herein, the actual rotation speed N' may alternatively be the actual rotation speed N sampled three periods before.

When the difference of rotation speed is larger than the first threshold ΔN1, the ECU 20 adds 1 to the judgment flag m (S208).

Next, the ECU 20 judges whether the judgment flag m is 3 or not (S209). When the judgment flag m is not 3, the control flow shifts to S212. When the judgment flag m is 3, the ECU 20 sets an EGR valve throttle control execution flag th to be 1 (S210).

Accordingly, when the reduction of the actual rotation speed N larger than the first threshold ΔN1 causes three times continuously, the load is judged to be increased suddenly and the control flow shifts to the EGR valve throttle control, whereby the fuel injection amount is prevented from reacting excessively to the change of the actual rotation speed N caused by the increase or reduction of load near the maximum permissible value. Namely, the throttle control of the EGR valve discussed later is only executed at the time of pertinent sudden increase of the load.

Figure 5:
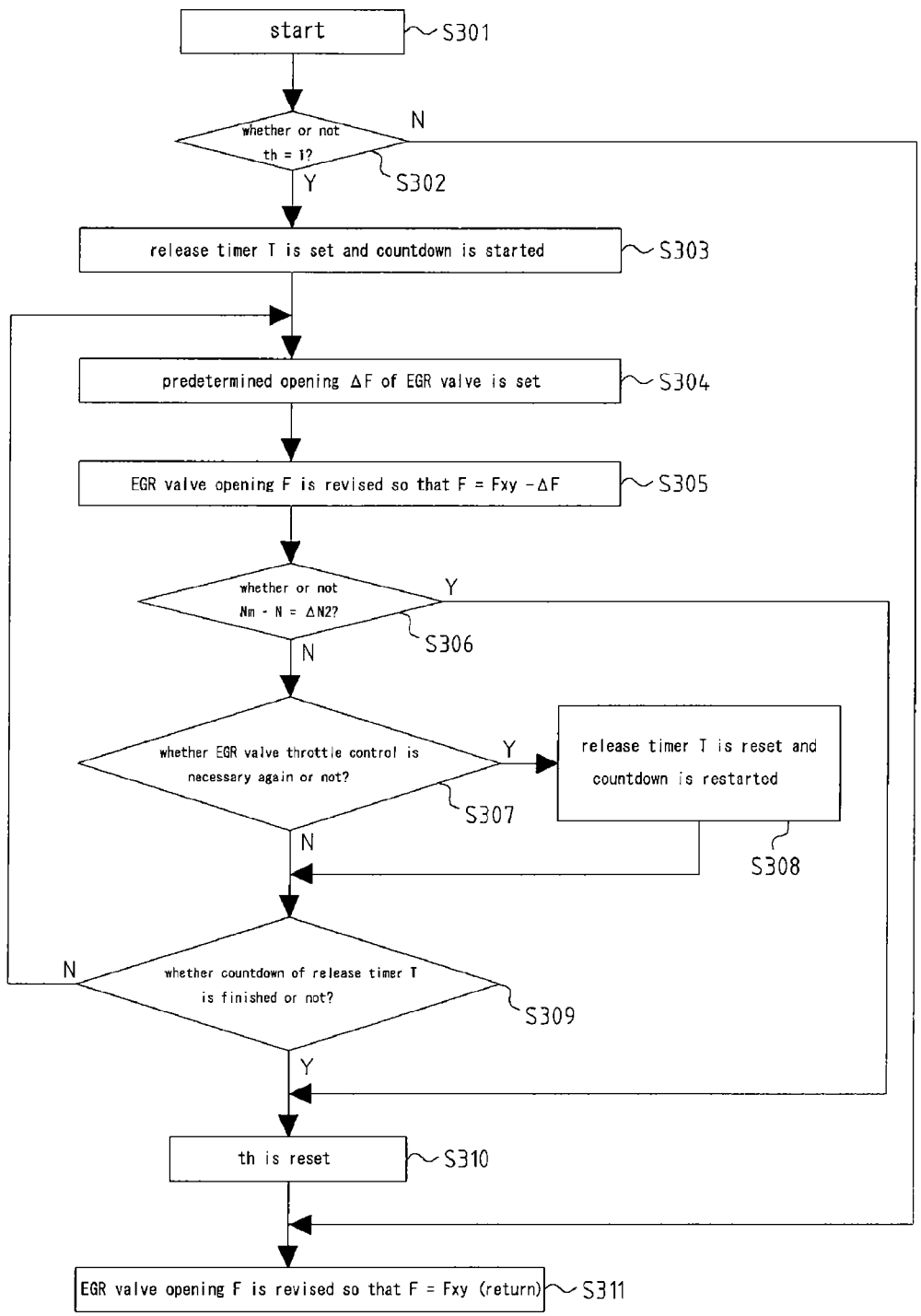
FIG. 5 is a flow chart of the throttle control of the EGR valve.

As shown in FIG. 5, with regard to the throttle control of the EGR valve, when the throttle control of the EGR valve is judged to be necessary at the EGR valve throttle control necessity judgment, the EGR valve 13 is closed for the predetermined opening ΔF from the normal set opening Fxy so as to suppress the EGR amount.

Firstly, at the start of the throttle control of the EGR valve (S301), the ECU 20 judges whether the EGR valve throttle control execution flag th is 1 or not (S302). When the EGR valve throttle control execution flag th is not 1, the control flow shifts to S311 and this control is not executed.

When the EGR valve throttle control execution flag th is 1, the ECU 20 sets a release timer T and simultaneously starts countdown of the release timer T (S303).

Next, the ECU 20 sets the predetermined opening ΔF of the EGR valve 13 (S304) and the EGR valve opening F is revised to be closed for the predetermined opening ΔF from the normal set opening Fxy (S305). The detailed description of the normal set opening Fxy will be given later.

The ECU 20 judges whether the difference between the target rotation speed Nm and the actual rotation speed N is smaller than a second threshold ΔN2 or not (S306). When the difference of rotation speed is smaller than the second threshold ΔN2, the control flow shifts to S310.

The target rotation speed Nm is rotation speed set by a rotation speed set means at the time of idling in the isochronus control, and is the rotation speed set by a rotation speed set means at the time of idling and then reduced according to the droop characteristic in the droop control.
The rotation speed set means is an accelerator lever or a throttle lever.

The second threshold ΔN2 is a target region that is a predetermined target region not more than the target rotation speed Nm and in which the rotation speed is judged to be close enough to the target rotation speed Nm. When the actual rotation speed N returns to the target region enough, the supercharger 11 is judged to be actuated normally.

Then, in the situation that the supercharger 11 is judged to be actuated normally, the EGR amount can be recovered immediately.

When the difference of rotation speed is not smaller than the second threshold ΔN2 and the EGR valve throttle control is judged to be necessary again at the EGR valve throttle control necessity judgment (S307), the release timer T is set again and simultaneously the countdown is started (S308).

Accordingly, regardless of the first setting of the release timer T, the EGR valve throttle control can be continued suitably even if the sudden increase of the load is performed gradually.

The ECU 20 judges whether the countdown of the release timer T has been finished or not (S309), and when the countdown has not been finished, the steps S204 to S208 are repeated.

When the countdown of the release timer T is finished, the ECU 20 resets the EGR valve throttle control execution flag th (S310) and the EGR valve opening F is revised to the normal set opening Fxy (S311).

Accordingly, when the supercharger 11 is actuated normally though the actual rotation speed N does not return to the target region enough because of the load state, unnecessary suppression of EGR amount can be prevented.

Figure 6:
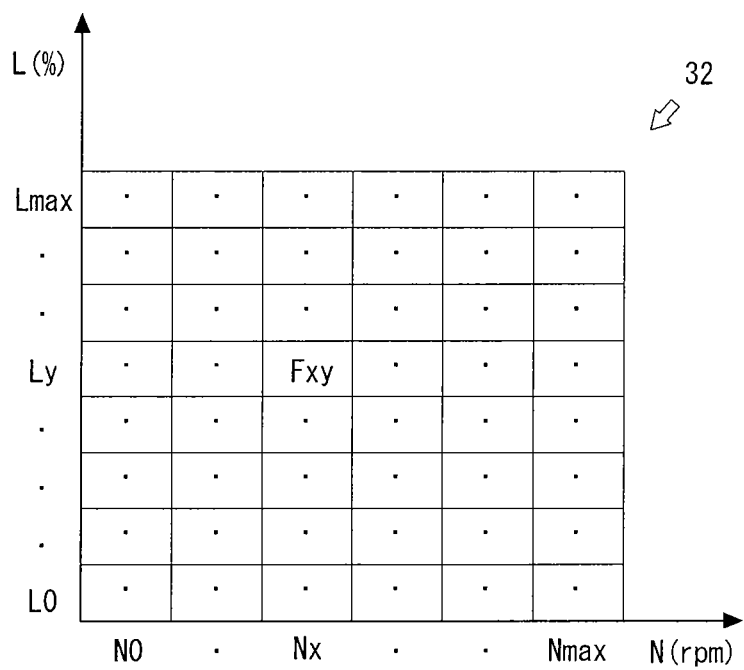
FIG. 6 is a table diagram of an ordinary opening setting map of the EGR valve.

As shown in FIG. 6, the normal set opening Fxy of the EGR valve 13 is previously stored in the ECU 20 as a normal opening setting map 32 indicated for each actual rotation speed N and each actual rack position L.

The actual rotation speed N is indicated as N(x) from N(min) to N(max). On the other hand, the actual rack position L(y) is indicated from L(min) to L(max). Namely, the number of the set normal set opening Fxy is the product of the number of the actual rotation speed N and the number of the actual rack position L.

Accordingly, at the normal driving, the EGR rate can be set corresponding to the actual rotation speed N and the load rate of the engine 10.

INDUSTRIAL APPLICABILITY

The present invention is adoptable to an engine having a supercharger and an exhaust gas recirculation (EGR) device.

The invention claimed is:
1. An engine comprising:
a supercharger;
an EGR device; and
an electronic control unit,
wherein the electronic control unit is configured to execute an isochronous control so as to keep a target rotation speed the same as that at idling or executes a droop control so as to reduce the target rotation speed a predetermined percentage corresponding to a load state when rotation speed of the engine is shifted from a no-load or light-load run to a high-load state,
wherein the electronic control unit is configured to control an EGR valve of the EGR device such that the EGR valve is either closed to an opening smaller than a normal set opening corresponding to a load state for a predetermined opening or fully closed when an actual rotation speed of the engine is detected to be lower than the target rotation speed,
wherein the electronic control unit is configured such that a condition for returning the opening of the EGR valve to the normal set opening corresponding to the load state is that a deficiency amount between the actual rotation speed against the target rotation speed is not larger than a predetermined amount, and
wherein the electronic control unit is configured such that passage of a predetermined time at load shift state is also adopted as a condition for returning the opening of the EGR valve to the normal set opening corresponding to the load state so that the opening of the EGR valve is returned to the normal set opening corresponding to the load state after the passage of predetermined time even if the return condition is not satisfied that the deficiency amount of the actual rotation speed against the target rotation speed is not larger than the predetermined amount.

2. An engine comprising:
a supercharger;
an EGR device; and
an electronic control unit,
wherein the electronic control unit is configured to execute an isochronous control so as to keep a target rotation speed the same as that at idling or executes a droop control so as to reduce the target rotation speed a predetermined percentage corresponding to load state when rotation speed of the engine is shifted from a no-load or light-load run to a high-load state,
wherein the electronic control unit is configured to control an EGR valve of the EGR device such that the EGR valve is either closed to an opening smaller than a normal set opening corresponding to a load state for a predetermined opening or fully closed when an actual rotation speed of the engine is detected to be lower than the target rotation speed, and
wherein the electronic control unit is configured to control the EGR valve of the EGR device such that the EGR valve is either closed so the opening is smaller than the normal set opening corresponding to the load state for the predetermined opening or fully closed when a difference between the actual rotation speed predetermined period before and a latest actual rotation speed is larger than a first threshold for predetermined times continuously.

3. The engine as set forth in claim 2, wherein:
when the latest actual rotation speed is larger than a predetermined rotation speed, a throttle control of the EGR valve is not executed.

4. The engine as set forth in claim 2, wherein:
at a judgment of a threshold, when an engine load rate at the first judgment is larger than a predetermined load rate, the throttle control of the EGR valve is not executed.

5. The engine as set forth in claim 2, wherein:
when a difference between the target rotation speed and the latest actual rotation speed is smaller than a second threshold, the opening of the EGR valve is returned to the normal set opening corresponding to the load state.

6. The engine as set forth in claim 5, wherein:
a release timer is actuated at a point of time of start of a throttle control of the EGR valve, and when the difference between the target rotation speed and the latest actual rotation speed is not smaller than the second threshold and a measurement time of the release timer reaches a predetermined time, the opening of the EGR valve is returned to the normal set opening corresponding to the load state.

7. The engine as set forth in claim 6, wherein:
when the execution condition of the throttle control of the EGR valve is satisfied again, the release timer is reset and actuated again.

\* \* \* \* \*